(12) United States Patent
Flaxman (10) Patent No.: US 9,975,576 B2
(45) Date of Patent: May 22, 2018

(54) DRIVE CONFIGURATIONS FOR SKID STEERED VEHICLES

(71) Applicant: QINETIQ LIMITED, Farnborough (GB)

(72) Inventor: Robert John Bonner Flaxman, Guildford (GB)

(73) Assignee: QINETIQ LIMITED, Hampshire (GB)

( * ) Notice: Subject to any disclaimer, the term of this patent is extended or adjusted under 35 U.S.C. 154(b) by 108 days.

(21) Appl. No.: 14/896,660

(22) PCT Filed: Apr. 25, 2014

(86) PCT No.: PCT/EP2014/058460
§ 371 (c)(1),
(2) Date: Dec. 7, 2015

(87) PCT Pub. No.: WO2014/206597
PCT Pub. Date: Dec. 31, 2014

(65) Prior Publication Data
US 2016/0107686 A1    Apr. 21, 2016

(30) Foreign Application Priority Data

Jun. 28, 2013   (GB) .................................. 1311628.0

(51) Int. Cl.
*B62D 11/04* (2006.01)
*F16H 48/36* (2012.01)
(Continued)

(52) U.S. Cl.
CPC .............. *B62D 11/04* (2013.01); *B62D 11/14* (2013.01); *B62D 55/08* (2013.01); *F16H 48/36* (2013.01); *F16H 2048/364* (2013.01)

(58) Field of Classification Search
None
See application file for complete search history.

(56) References Cited

U.S. PATENT DOCUMENTS

| 4,998,591 A | 3/1991 | Zaunberger |
| 5,509,491 A * | 4/1996 | Hall .................. B60K 1/02 |
| | | 180/6.44 |

(Continued)

FOREIGN PATENT DOCUMENTS

| GB | 2445504 A | 7/2008 |
| GB | 2473314 A | 3/2011 |

(Continued)

OTHER PUBLICATIONS

Search Report under Section 17(5) issued in British Application No. GB1311628.0.

(Continued)

*Primary Examiner* — Jacob S. Scott
*Assistant Examiner* — Timothy Hannon
(74) *Attorney, Agent, or Firm* — Kenealy Vaidya LLP (57) ABSTRACT

Some embodiments are directed to a controlled differential adapted to couple two shafts and steer input, such as those provided in a drive configuration for a skid steered vehicle, the controlled differential including a pair of planet carriers arranged to turn with respective shafts; a pair of ring gears interconnected by a cross-shaft such that the ring gears rotate in common; planet gears and a pair of sun gears, the sun gears being coupled to at least one steer motor to enable rotation of the sun gears in mutually opposite senses upon input from the steer motor.

6 Claims, 5 Drawing Sheets

(51) Int. Cl.
  *B62D 55/08*   (2006.01)
  *B62D 11/14*   (2006.01)

(56) References Cited

U.S. PATENT DOCUMENTS

| | | | |
|---|---|---|---|
| 6,321,865 B1 * | 11/2001 | Kuribayashi | B60K 6/365 |
| | | | 180/243 |
| 6,491,599 B1 | 12/2002 | Schmidt | |
| 6,540,632 B1 * | 4/2003 | Wendl | B60K 7/0007 |
| | | | 180/65.51 |
| 6,953,408 B2 * | 10/2005 | Thompson | B62D 11/14 |
| | | | 180/6.44 |
| 7,074,151 B2 * | 7/2006 | Thompson | B60K 7/0007 |
| | | | 180/6.28 |
| 2003/0106725 A1 | 6/2003 | Irikura | |
| 2007/0213160 A1 | 9/2007 | Lyons et al. | |
| 2008/0210481 A1 | 9/2008 | Boss et al. | |
| 2008/0300080 A1 * | 12/2008 | Thompson | B62D 11/14 |
| | | | 475/18 |
| 2010/0105511 A1 * | 4/2010 | Thompson | F16H 35/008 |
| | | | 475/6 |
| 2012/0283061 A1 * | 11/2012 | Karlsson | B60K 1/00 |
| | | | 475/150 |

FOREIGN PATENT DOCUMENTS

| | | |
|---|---|---|
| WO | 02083482 A1 | 10/2002 |
| WO | 02083483 A1 | 10/2002 |
| WO | 2006021745 A1 | 3/2006 |
| WO | 2008117025 A1 | 10/2008 |

OTHER PUBLICATIONS

International Search Report issued in International Application No. PCT/EP2014/058460.
Written Opinion of the International Searching Authority issued in International Application No. PCT/EP2014/058460.

* cited by examiner

DRIVE CONFIGURATIONS FOR SKID STEERED VEHICLES

GOVERNMENT LICENSE RIGHTS

The present inventions were made with government support under contract number W56HZV-11-C-0001 awarded by United States Department of Defense. The government has certain rights in the invention.

CROSS REFERENCE TO RELATED APPLICATION

This application is a National Phase filing under 35 C.F.R. § 371 of and claims priority to PCT Patent Application No.: PCT/EP2014/058460, filed on Apr. 25, 2014, which claims the priority benefit under 35 U.S.C. § 119 of British Application No.: 1311628.0, filed on Jun. 28, 2013, the contents of which are hereby incorporated in their entireties by reference.

FIELD OF THE INVENTION

The present inventions relate to novel drive configurations for skid steered vehicles, including tracked or wheeled vehicles, for example but not limited to, a military armoured tank.

BACKGROUND TO THE INVENTION

A skid steered tracked vehicle is steered by forcing opposing parallel tracks to run at different speeds (skid steering). Similarly, a skid steered wheeled vehicle is steered by forcing wheels on one side of the vehicle to run at different speeds to the wheels on the other side of the vehicle. For tracked vehicles to steer, large driving force differences are required between the two tracks—large braking forces on the inner track and high driving forces on the outer track. Differential gears and cross-shafts are used to control the relative speeds of the tracks and transfer the braking power from the inner track to the outer track to sustain the turn. A similar arrangement is used for a skid steered wheeled vehicle.

A number of electric track drive arrangements use a separate electric motor (propulsion or traction motor) to drive each track, known as a "two-line" system. The regenerative steering power in such a system is generally handled electrically resulting in the need for oversized motors and power converters to handle this power. An alternative configuration uses the same mechanical regenerative arrangement as in a conventional transmission combined with an electric drive, known as a "cross-shaft electric drive" system. In this arrangement, the steer cross-shaft runs across the vehicle outside the propulsion motor which increases the size of the assembly and requires a number of idler gears. If a gear-change is to be used, the propulsion cross-shaft should be separate from the motor shaft. This can be achieved by making the motor shaft hollow and passing the cross-shaft through the motor shaft. However, this increases the diameter of the motor bearings making a high speed motor difficult to achieve. The propulsion cross-shaft may be mounted outside of the motor, or the motor mounted outside of the propulsion shaft but this increases the package size and adds the needs for idler gears, increasing the complexity of the arrangement and reducing its efficiency.

U.S. Pat. No. 4,998,591 discloses a drive configuration which uses a single differential, mounted centrally and driven by a single propulsion motor. The differential is identical to a single differential in a conventional wheel driven car or truck axle. The torque from the drive motor is divided equally between the two half shafts which can rotate at different speeds relative to one another. On each half shaft is mounted a steer motor. To steer the vehicle, the inside steer motor must act as a brake and the outside steer motor must apply additional driving torque to generate the large track drive force difference across the vehicle to cause it to skid steer. The steer motors are operating at the speed of the half shafts, handling high torque and at high power, one regenerating and one driving and thus require oversized motors.

The present Applicant, QinetiQ Limited, has developed skid steering arrangements that make use of a controlled differential. A controlled differential has the characteristics that it couples two half shafts and controls their speeds. When the steer motor is stationary the two half shafts are simply coupled by the control differential so that they run at the same speed. When the steer motor is rotated in one direction one half shaft runs faster than the other and when the steer motor is rotated in the other direction, the other half shaft runs faster than the other. Operation of the steer motor thereby causes the vehicle to turn.

WO 02/083482 describes an electric drive configuration for a skid steered vehicle wherein a pair of propulsion motors is each in operable communication with one of a pair of rear track drive sprockets. The steer motor is in drivable communication with a controlled differential steer gear unit positioned centrally of a pair of steering cross-shafts and in drivable communication with each shaft, the opposing end of these shafts being in operable communication with one of a pair of front track drive sprockets. This arrangement enables fitting of the steering cross-shaft and controlled differential at one end of the vehicle and the drives at the other end of the vehicle, simplifying the packaging of the arrangement and reducing the volume taken up in the hull. Both track drives at the rear of the vehicle are able to continue to drive the vehicle forwards during turning unlike the two-line system where inside motors brake and the outside motors apply additional driving power to cause the vehicle to turn.

WO 02/083483 relates to another drive configuration having a controlled differential configured to cause transmission of regenerative steering powers through the propulsion motor shaft thereby removing the need for cross-shafts. A steer motor is mounted on a cross-shaft which is interconnected via gears with a shaft of the controlled differential which in turn is connected via gears and an output shaft of the controlled differential to each propulsion motor.

WO2006/0121745 describes a central casing for housing the various components of the electric drive transmission. The electric propulsion motors each comprise a stator fixed in the casing and associated with a rotor borne within the casing. A through-shaft passes coaxially through the rotor for delivering torque from each motor to track drive sprockets and a gear change mechanism is located within the casing to transmit torque from the rotor to the through-shaft at selected gear ratios. The through-shaft is rotationally supported by bearings acting between the shaft and the casing and the rotor is rotationally supported by bearings between the rotor and shaft. This enables the motor rotor bearings to be simple, small diameter low speed rated ball bearings. The arrangement also reduces the number of bearing points in the casing and the complexity, mass and cost of the casing and the overall size of the transmission can be reduced.

WO 2008/117025 describes a controlled differential for a skid steered vehicle that has a parallel pair of planetary gear sets but comprising compound (linked) planet gears in a common planet carrier coupling two motor drive shafts. Respective ring gears turn with the shafts and mesh with the compound planet gear in the planet carrier, the ratios of the teeth between each ring gear and the respective gear of the compound planet gear being unequal so that when the planet carrier is stationary the two shafts are coupled through the differential to turn together in the same sense but with a speed difference. Controlled rotation of the planet carrier varies the speed difference between the shafts in accordance with the sense and speed of rotation of the planet carrier.

The controlled differential for known skid steer transmission systems is more efficient for low speed-high torque applications. In order to minimise the control differential torque (and hence the overall weight) the rotational speed is stepped up through multiple gears in order to drive the tracks or wheels. The bearings can be highly loaded during straight-line driving as well as during steering which is not ideal. As the speed of the vehicle increases, the high speed controlled differential causes increased parasitic spin losses due to friction and aerodynamic drag. The high centripetal forces also put high stress on the bearing cages of the planet gears. The bearing stress can be addressed by the use of high strength bearing cages with anti-wear coatings but these are expensive and therefore add to the cost of the system. The heat generated is removed by the provision of cooling oil to regulate the control differential temperatures.

During a skid-steer turn, the regenerated steering power from the inside track (sprocket) is transferred through the inside final drive gear reduction, through the transmission and through the outside final drive gear reduction to the outside track (sprocket). The transmission arrangements of the prior art transfer the regenerative steering power through the transmission through four gear stages (i.e. the (inside) output gear reduction stage, the two gear sets of the steer differential, and the (outside) gear reduction stage). Given that each planetary gear stage introduces a reduction in efficiency of the energy transfer, the use of multiple gear sets leads to a reduction in efficiency of the system. The output gear stages also need to be sized to transfer the same steering power and torque as the final drive and output track sprockets, requiring large output gear stages.

Furthermore, the maximum propulsion or traction motor speed in the prior art designs is currently limited to that of the main shaft. The maximum main shaft speed is limited by the controlled differential speed and the maximum allowable load on the controlled differential planet gear bearings. For the same power output of an electric motor, the faster the motor speed can be, the smaller the size of the traction motor and associated gearing (and hence the lower the overall weight and size).

The propulsion motor speed sensors (resolvers) of the known systems are also susceptible to electro-magnetic interference due to their position around the main shaft inside the motor rotor. Additionally, there is the potential for the motor currents to cause electrical discharge machining of the gear elements, possible incompatibility of the gearbox oil with the electric motor components, and a less than optimal solution for the transmission package in terms of size, weight and efficiency; all these issues require specific remedies that complicate the design.

The present invention aims to provide novel drive configurations and controlled differentials for skid steered vehicles which seek to overcome, or at least alleviate, one or more of the aforementioned problems encountered with the prior art drive configurations.

SUMMARY OF THE INVENTION

In accordance with a first aspect of the present invention there is provided a controlled differential adapted to couple two shafts and steer input, such as those provided in a drive configuration for a skid steered vehicle, the controlled differential comprising: a pair of planet carriers arranged to turn with respective shafts; a pair of ring gears interconnected by a cross-shaft such that the ring gears rotate in common; planet gears and a pair of sun gears, the sun gears being coupled to at least one steer motor to enable rotation of the sun gears in mutually opposite senses upon input from the steer motor.

According to a second aspect of the present invention there is provided a controlled differential adapted to couple two shafts comprising: first and second outer ring gears arranged to turn with respective shafts; first and second inner ring gears interconnected by a cross-shaft such that the inner ring gears rotate in common; planet gears and planet carriers, the carriers being coupled to at least one steer motor whereby operation of the steer motor enables rotation of the carriers in mutually opposite senses and a corresponding change in rotation of the one or each shaft via the ring and planet gears.

The controlled differential according to the second aspect of the present invention may be incorporated into a standard drive configuration for a skid steered vehicle comprising a respective drive member adapted to be located at each side of the vehicle, each drive member engaging with a track or wheel of the vehicle; at least one propulsion motor in operable communication with said drive members operable to drive the tracks or wheels of the skid steered vehicle; at least one steer motor in driveable communication with the carrier of the controlled differential according to the first aspect of the present invention, the controlled differential being positioned between and connecting two shafts and being in driveable communication with each shaft, the ends of each shaft remote from the controlled differential forming an output of the transmission and being in driveable communication with the drive members. The incorporation of the novel controlled differential of the first aspect of the invention reduces load on bearings supporting the planet gears during straight line driving of a skid steered vehicle.

Preferably, a final drive unit or final drive reduction gear is provided on each shaft positioned between the transmission output and the drive member. At least one gear reduction stage and/or gear change unit associated with said propulsion motor is generally provided between the controlled differential and the drive member. The controlled differential is provided between the two transmission outputs.

It is to be appreciated that the drive configuration should also include at least one brake and that any number of gear reduction stages may be included to give a desired optimum balance of weight, volume, efficiency and reliability.

A third aspect of the present invention provides a novel drive configuration for a skid steered vehicle. The drive configuration may incorporate a controlled differential according to the first aspect of the present invention, incorporate a conventional controlled differential according to the prior art or may incorporate novel controlled differentials according to later aspects of the invention. The novel drive configuration re-positions the shafts to be in direct contact with the drive members. Rather than the output of the controlled differential connecting to the input of an output gear reduction, the output of the controlled differential connects directly to the output of the transmission. Generally, the output from the propulsion motor and the gear reduction stage(s) will be connected in parallel to the transmission output.

To this end, a third aspect of the present invention provides a novel drive configuration comprising: a respective drive member adapted to be located at each side of the vehicle, each drive member engaging with a track or wheel of the vehicle; at least one propulsion motor in operable communication with said drive members operable to drive the tracks or wheels of the skid steered vehicle; at least one steer motor in driveable communication with the controlled differential, the controlled differential being positioned between and connecting two shafts and being in driveable communication with each shaft, the ends of each shaft remote from the controlled differential forming the transmission output and being in driveable communication with the drive members, wherein at least part of the output of the controlled differential connects directly to the transmission output.

In the context of this disclosure, the term "connects directly to" means that the controlled differential output attaches solidly to and turns at the same speed without any gear mesh loss or coupling that would introduce a power transfer loss. The controlled differential output preferably does not pass through any range change gears. Preferably, a spline coupling connects a part of the controlled differential directly to the, or each, shaft. One or both output sides of the controlled differential may connect directly to the transmission output.

Preferably, the drive configuration includes a gear reduction unit and/or gear change unit which may be indirectly connected to the transmission output. Preferably, the transmission output is connected to a final drive input. It is preferable for the propulsion motor and/or gear reduction/change units to be connected in parallel to the transmission output.

It is to be appreciated that bearings should be provided to rotationally support the shafts and gears.

The aforesaid arrangement enables the speed of the propulsion motor to be independent of the main drive shaft and controlled differential. The centripetal load on the planet bearings is still present but since the speeds are much less, the bearings do not experience the current level of parasitic loss at high speeds and standard bearing cages may be used. The controlled differential and drive configuration according to the first and second aspects of the invention reduce wear on the bearings enabling standard bearings to be used.

As mentioned above, the third aspect of the present invention may be provided with a conventional controlled differential adapted to couple two shafts and steer input comprising: a pair of planetary gear sets, each comprising a sun gear, planet gears carried by a planet carrier and a ring gear, the sun gears being coupled to at least one steer motor whereby operation of the steer motor enables rotation of the sun gears in mutually opposite senses, the planet carriers being interconnected by a cross-shaft such that the carriers rotate in common, the shafts of the drive configuration being coupled to respective ring gears.

Alternatively, a modified controlled differential according to a fourth aspect of the present invention may be used. The fourth aspect of the present invention provides a controlled differential adapted to couple two shafts and a steer input, such as those provided in a drive configuration for a skid steered vehicle, the controlled differential comprising: a planet carrier arranged to turn with one of said shafts and being in direct communication with an output carrier of a first output gear reduction stage; a first controlled differential sun gear arranged to turn with the other of said shafts and being in direct operable communication with a second sun gear of a second output gear reduction stage; a ring gear being coupled to at least one steer motor through a series of gear reduction stages to enable a differential torque to be applied at the first sun gear and planet carrier.

A second planet carrier may be coupled to a second set of planet gears, the second planet carrier to be in direct operable communication with the output drive. The gear reduction stages between the ring gear and the steer motor may consist of a planetary gear set.

The aforesaid arrangement enables the torque from the controlled differential carrier to go directly into the transmission output whereas the torque from the controlled differential sun gear goes into an output gear reduction sun gear and another gear reduction. Thus, the controlled differential output is connected directly to the transmission output on only one side of the drive transmission. The speed of the propulsion motor and controlled differential may be set the same but the sizing of the differential would be no different than the sizing of the output gear reduction therefore alleviating specific issues with the controlled differential of the prior art.

The present invention also provides for alternative embodiments of the second aspect of the present invention having novel drive configurations with a modified layout of the component parts. Again, the controlled differential is coupled directly to the transmission output, preferably without passing through any range change gears.

This drive configuration may be provided with a conventional controlled differential to couple the shafts and steer input or be provided with a controlled differential according to the first, third or fourth aspects of the present invention.

To this end, a fifth aspect of the present invention provides a drive configuration for a skid steered vehicle comprising a respective drive member adapted to be located at each side of the vehicle, each drive member engaging with a track or wheel of the vehicle; at least one propulsion motor in operable communication with said drive members operable to drive the tracks or wheels of the skid steered vehicle; at least one steer motor in driveable communication with a controlled differential positioned between and connecting a pair of primary shafts and in driveable communication with each primary shaft, the ends of each primary shaft remote from the controlled differential forming an output of the transmission and being in driveable communication with the drive members; wherein the at least one propulsion motor is provided on a secondary shaft remote from the primary shafts.

A final drive unit or final drive reduction gear is preferably provided on each primary shaft positioned between the drive member and the output of the transmission.

More preferably, at least one gear reduction stage and/or gear change unit associated with said propulsion motor is provided remote from the primary shaft, more preferably both the gear reduction and gear change units are provided remote from the primary shaft with the propulsion motor on the secondary or lay shaft. Preferably the gear reduction and gear change units are provided in series whereby the controlled differential connects to the shaft in parallel with the output gear reduction from the propulsion motor.

The at least one gear change unit associated with said propulsion motor provided remote from the primary shaft may be coupled directly to the secondary shaft or through a tertiary shaft through which the selectable gears may be attached.

The drive configuration according to the fifth aspect of the present invention may include at least one resolver to monitor the speed of the motor, preferably being positioned on the unattached end on at least one propulsion motor mounted on the secondary (or tertiary) shaft.

The aforesaid arrangement enables the speed of the propulsion motor to be independent of the primary shaft and controlled differential. The repositioning of one or more gear sets from the primary shaft to the secondary shaft is also desirable and the lay out provides greater versatility for the positioning of the various components of a drive transmission system.

A sixth aspect of the present invention provides a novel controlled differential adapted to couple two shafts and steer input, such as those provided in a drive configuration for a skid steered vehicle, the controlled differential comprising a pair of planetary gear sets comprising at least a pair of planet carriers, planet gears and ring gears, at least one of the pairs being arranged to turn with respective shafts, at least one of the other pairs being interconnected by a cross-shaft such that these gears rotate in common and the gears of at least one of another pair being coupled to at least one steer motor to enable rotation of these gears in mutually opposite senses upon input from the steer motor, the controlled differential further comprising a releasable locking mechanism for temporary locking of the cross-shaft whereby at least one steer motor provides torque and power through the controlled differential.

The provision of a locking mechanism to lock the differential cross shaft requires the steer motors to be de-coupled from one another and the speed and direction of the steer motors can be independently controlled.

Preferably, the locking mechanism comprises a clutch mechanism. The controlled differential according to the sixth aspect of the present invention may be incorporated into a drive configuration for a skid steered vehicle comprising: a pair respective drive members adapted to be located at each side of the vehicle, each drive member engaging with a track or wheel of the vehicle; at least one propulsion motor in operable communication with said drive members operable to drive the tracks or wheels of the skid steered vehicle; at least one steer motor in driveable communication with a controlled differential according to the sixth aspect of the present invention, the controlled differential being positioned between and connecting two shafts and being in driveable communication with each shaft, the ends of each shaft remote from the controlled differential forming an output of the transmission and being in driveable communication with the drive members.

Preferably, the locking clutch mechanism enables locking of the cross-shaft to a housing surrounding the components of the drive configuration.

It is to be appreciated that the sixth aspect of the present invention may be provided in any of configurations according to the first, second, third, fifth and sixth aspects of the present invention wherein a locking mechanism may be applied to lock the cross shaft to allow use of the steer motors for low speed propulsion.

The present invention also provides a vehicle equipped with a drive configuration and/or controlled differential according to any of the aspects of the invention.

BRIEF DESCRIPTION OF THE DRAWINGS

For a better understanding of the present invention and to show more clearly how it may be carried into effect, embodiments of the invention will now be described, by way of example only, with reference to the following Figures in which.

DETAILED DESCRIPTION

Figure 1:
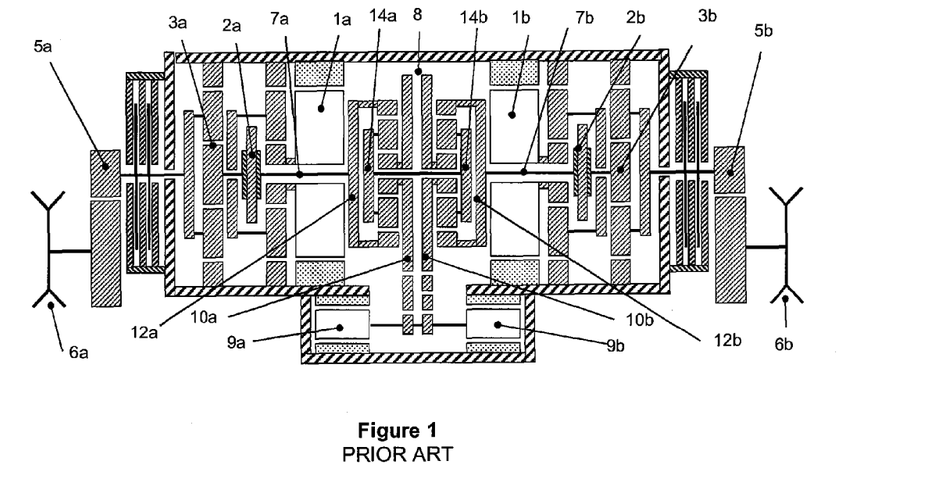
FIG. 1 is a diagrammatic illustration of a prior art drive configuration.
Figure 2:
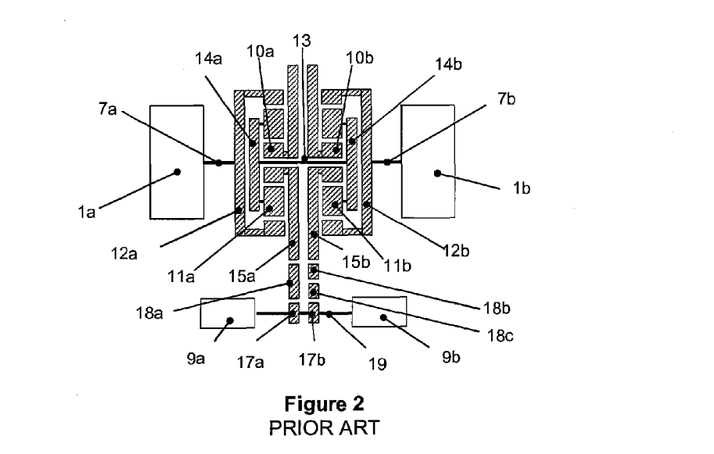
FIG. 2 illustrates schematically an example of a mechanism for the controlled differential of FIG. 1.

FIGS. 1 and 2 of the accompanying drawings illustrates diagrammatically one drive transmission arrangement for a skid steer vehicle according to the prior art. The traverse drive arrangement comprises two propulsion motors, also known as traction motors 1a, 1b. Outboard of each motor there is a planetary gear range change unit 2a, 2b, planetary gear reduction stage 3a, 3b and final drive gear reduction 5a, 5b leading to respective track drive sprockets 6a, 6b at opposite sides of the vehicle. Inboard, the motor drive shafts 7a, 7b are coupled to opposite sides of a controlled differential 8 which can be driven by a coupled pair of electric steer motors 9a, 9b. All of the aforesaid components except the final drive gear reduction 5a, 5b and drive members 6a, 6b form the transmission.

A more detailed representation of the controlled differential 8 is shown schematically in FIG. 2. It comprises a pair of planetary gear sets or epicyclic gear trains joined back-to-back, each comprising a sun gear 10a, 10b, planet gear 11a, 11b, a planet carrier 14a, 14b and a ring gear 12a, 12b. The ring gears 12a, 12b connect to the main output drive shafts 7a, 7b and the sun gears 10a, 10b connect to the steer motors 9a, 9b via wheels 15a, 15b that mesh with a pinions 17a, 17b via idlers 18a, 18b, 18c on the end of a steer motor shaft 19. The carriers 14a, 14b connect to a cross-shaft 13. For straight-line driving, the steer motors 9a, 9b pinion 17a, 17b, idlers 18a, 18b, 18c, wheels 15a, 15b and sun gears 10a, 10b are stationary whilst the ring gears 12a, 12b and carriers 14a, 14b can spin continuously. In this respect, energising the propulsion motors 1a, 1b to drive the sprockets 6a, 6b also rotates the annuli or ring gears 12a, 12b and causes the planet gears 11a, 11b to rotate about the sun gears 10a, 10b. The planet carriers 14a, 14b also rotate at the same speed due to being connected through the cross shaft 13, equalising the speeds of the two annuli 12a, 12b and the two connected transmission drives 1a, 1b causing the tracks to operate at the same speed and therefore move in a straight line. However, the continuously rotating carrier 14 results in the bearings of the planet gears 11a, 11b being subjected to g-forces due to the centripetal forces from the planet mass itself which load the bearings continuously. The bearing cages which hold the rolling elements of the bearing in place are also subjected to the same g-forces. The loads get higher as the main shaft increases in speed. This can lead to parasitic losses and stressed bearing cages being experienced with straight-line driving alone which increases with the speed.

The vehicle is turned in one sense by operation of the steer motors 9a, 9b. The steer motor is energised to rotate the pinion 17a, 17b in the same sense as the steer motor, thus causing the wheels 15a, 15b via idlers 18a, 18b, 18c and their respective sun gears 10a or 10b to rotate in mutually opposite senses. The two planet carriers 14a, 14b must always turn together resulting in an increase in the rate of rotation of the planet gears 11a or 11b in that set for which the sun gear 10a or 10b is turning in the opposite sense to the respective annulus 12a or 12b and a decrease in the rate of rotation of the planet gears 11a or 11b in that set for which the sun gear 10a or 10b is turning in the same sense as the respective annulus 12a or 12b. This causes the annuli and their respective connected transmission drives to the sprockets 6a, 6b to run at different speeds thus turning the vehicle in the required sense, while power from the slower running transmission drive is regenerated to the faster running transmission drive through the controlled differential 8.

In this arrangement one end of the main shaft is connected to the controlled differential 8 ring gears 12a, 12b and the other end of the main shaft is connected to the input (i.e. sun) of the gear reduction stage 3a, 3b. Therefore, steering power flows into the transmission on one side and must pass through the output gear reduction stage gear meshes on the other side before exiting the transmission. Power passes through four sets of epicyclic gear meshes.

The aforementioned controlled differential is fit for purpose but it is desirable to reduce the current level of spin losses during high speed straight-line driving and reduce the dependency on specialised bearing cages.

The various aspects of the present invention provide changes to the architecture and/or controlled differential gear arrangements to provide more efficient and reliable drive transmission systems.

Figure 3:
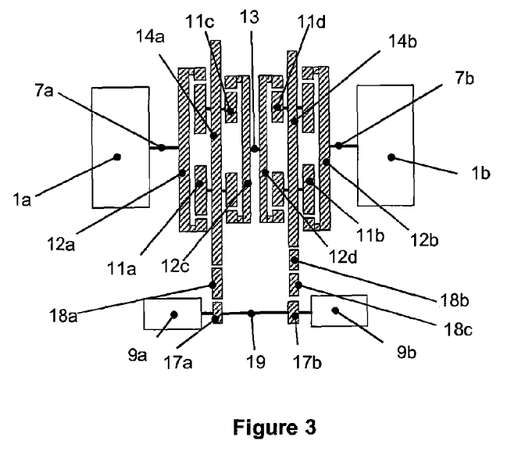
FIG. 3 shows one embodiment of a controlled differential according to a second aspect of the present invention.
Figure 4:
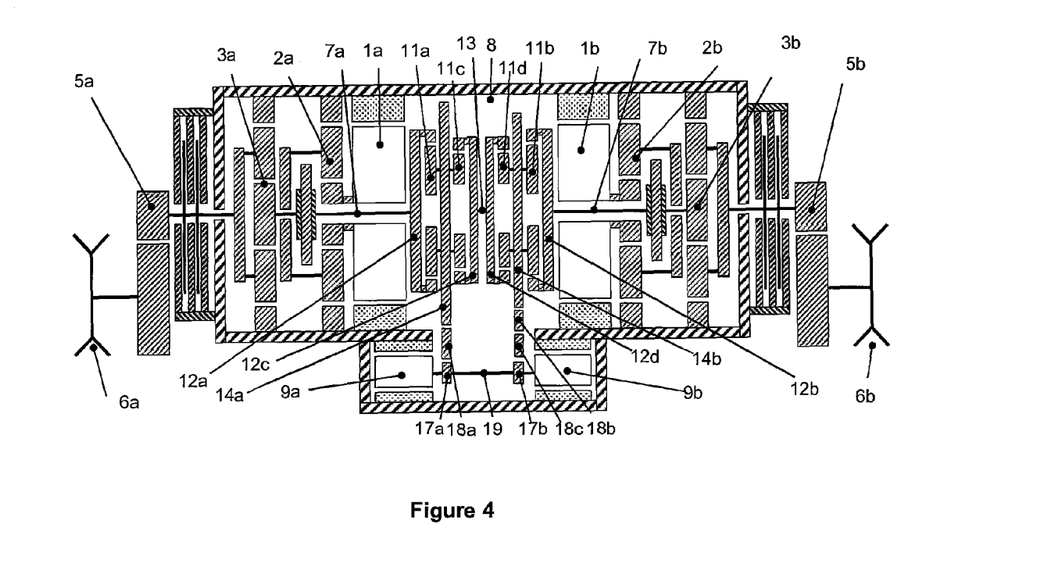
FIG. 4 illustrates the controlled differential of FIG. 3 installed into the prior art drive configuration of FIG. 1.

FIGS. 3 and 4 of the accompanying drawings illustrate one embodiment of a novel controlled differential arrangement according to a second aspect of the present invention which aims to address the current level of spin losses during straight-line driving and the need for specialised bearing cages. Identical features to those present in FIGS. 1 and 2 are given the same reference numerals for simplicity. Note that the figures only show the transmission part of the system with the brakes, final drive units 5a, 5b and drive members 6a, 6b, which are common to all designs, being omitted.

FIG. 3 provides a detailed representation of the new controlled differential and FIG. 4 illustrates the controlled differential installed in the prior art drive transmission layout of FIG. 1. The controlled differential comprises a pair of gear sets joined back-to-back, each comprising compound planet gears 11a, 11b, 11c, 11d, planet carriers 14a, 14b and a ring gears 12a, 12b, 12c, 12d. There are no sun gears. The ring gears 12a, 12b connect to the main output drive shafts 7a, 7b and the planet carriers 14a, 14b connect to the steer motors 9a, 9b via idlers 18a, 18b, 18c that mesh with a pinions 17a, 17b on the end of a steer motor shaft 19. The compound planet gears 11a, 11b connect to the outer ring gears 12a, 12b and planet gears 11c, 11d connect to inner ring gears 12c, 12d. The inner ring gears 12c, 12d connect to a cross-shaft 13. Again, one end of the main shaft 7a, 7b is connected to the ring gears 12a, 12b and the other end of the shaft connected to the input (i.e. sun) of the gear reduction stage 3a, 3b (see FIG. 4).

For straight-line driving, the steer motor 9a, 9b pinion 17a, 17b idlers 18a, 18b, 18c, and carriers 14a, 14b are stationary whilst the ring gears 12a, 12b, 12c, 12d will spin continuously. In this respect, energising the propulsion motors 1a, 1b to drive the sprockets 6a, 6b also rotates the outer annuli or ring gears 12a, 12b and causes the compound planet gears 11a, 11b, 11c, 11d to rotate about their pin axis. The inner annuli or ring gears 12c, 12d will rotate at the same speed due to being connected through the cross shaft 13. The speeds of the two outer annuli 12a, 12b and the two connected transmission drives 1a, 1b cause the tracks to operate at the same speed and therefore move in a straight line.

The planet gears 11a, 11b, 11c, 11d rotate only about their pin axis for straight-line driving and their respective bearings are not subjected to any centripetal forces until the vehicle turns thus reducing the parasitic losses associated with the centripetal forces and forces on the bearings cages.

The vehicle is turned in one sense by operation of the steer motor 9a, 9b. The steer motor is energised to rotate the pinion 17a, 17b in the same sense as the steer motor, thus causing carriers 14a, 14b via idlers 18a, 18b, and 18c to rotate in mutually opposite senses. Rotating the carriers 14a and 14b in mutually opposite directions will also rotate the compound planets 11a, 11c and 11b, 11d in mutually opposite directions. One side will increase the speed of the outer ring gear 12a or 12b and the other side the other side will decrease the speed of the outer ring 12b or 12a causing their respective connected transmission drives to the sprockets 6a, 6b to run at different speeds thus turning the vehicle in the required sense, while power from the slower running transmission output drive is regenerated to the faster running transmission output drive through the controlled differential 8.

Figure 5:
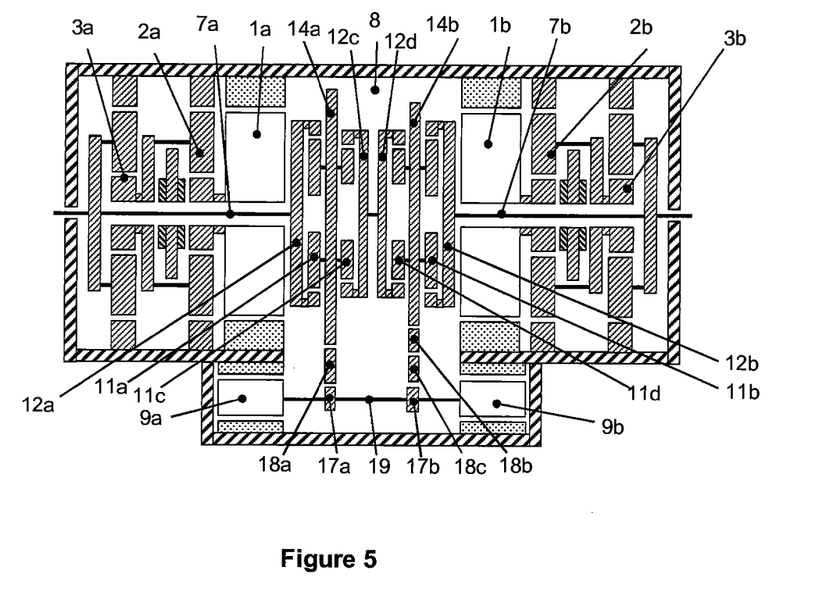
FIG. 5 shows one embodiment of a drive transmission system according to a third aspect of the present invention, fitted with the controlled differential shown in FIG. 3.
Figure 6:
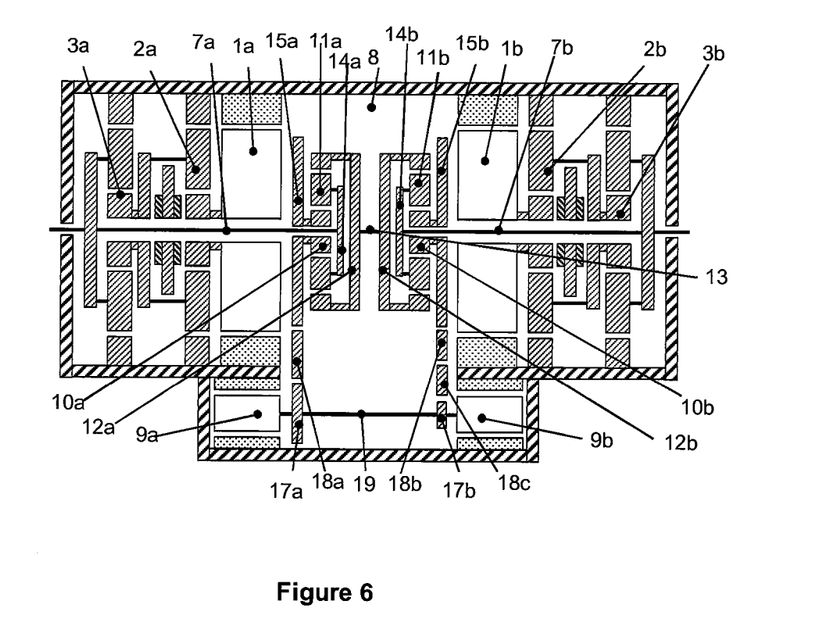
FIG. 6 shows the drive transmission system of the first aspect of the present invention provided with a novel controlled differential according to a third aspect of the present invention.
Figure 7:
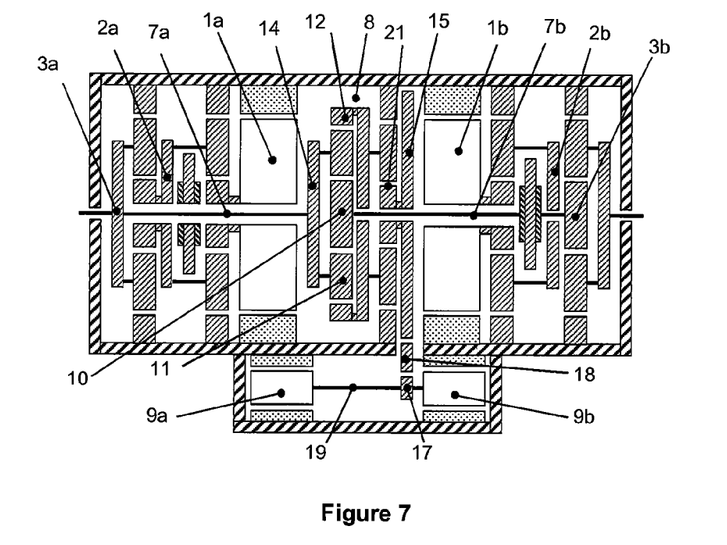
FIG. 7 is an alternative embodiment of a drive transmission system according to the present invention, incorporating the third aspect of the present invention on one side of the system only and being provided with a novel controlled differential according to a fourth aspect of the present invention.

FIGS. 5 to 7 of the accompanying drawings illustrate embodiments of a third aspect of the present invention. The system architecture is altered to improve further the efficiency and reliability of the drive transmission system. These figures again show only the transmission part of the layout, with the brakes, final drive units and drive members being omitted for simplicity. In certain embodiments, the controlled differential is also changed as the re-arrangement of the system architecture may lend itself to a more optimal arrangement of gears within the controlled differential.

Referring to the first embodiment shown in FIG. 5, the main shafts 7a, 7b are no longer connected to the transmission output through output gear reductions 3a, 3b but directly become the output of the transmission. The propulsion motors 1a, 1b are no longer directly connected to the main shaft 7a, 7b via the gear change 2a, 2b but go through the output gear reduction stages 3a, 3b. The controlled differential 8 is still connected directly to the main shafts 7a, 7b. In this manner, the power transfer from one side of the transmission needs only to travel through the controlled differential and the losses associated with the output gear reduction stages is no longer present thus making the system more efficient.

In more detail, the controlled differential ring gear 12a, 12b is connected directly to the main shaft 7a, 7b. In the context of the present disclosure, the phrase "connected directly to" means attached solidly to and turns at the same speed as the shaft without any gear mesh loss or with any type of coupling that would introduce a power transfer loss. For example, the ring gears may be connected to the shaft via a spline coupling. The output carrier of the gear reduction stage 3a, 3b is connected directly to the main shaft 7a, 7b along the middle of the shaft via a spline coupling, with the other end of the shaft being the transmission output. In this arrangement, the output shaft has two parallel power sources; one from the propulsion or traction motor 1a, 1b via the range change 2a, 2b and the output gear reduction stages 3a, 3b and the other from the controlled differential 8. The main shaft 7a, 7b connects directly to the controlled differential 8 on one end and to the transmission output on the other end. The output (i.e. carrier) of the gear reduction stage 3a, 3b connects directly to the shafts 7a,7b in parallel (i.e. shafts 7a, 7b, 3a output carrier, 3b output carrier, 12a, 12b all rotate at the same speed). The steering power flows into the transmission on one side and only need pass through the controlled differential gear meshes and out the other side. Power does not need to flow through any of the output gear reduction stage gear meshes and therefore power only flows through two sets of epicyclic gear meshes.

The controlled differential will operate in straight line driving and steering as described in relation to FIGS. 1 and 2 although it will be rotating at a slower rate since it no longer has to go through the output gear reduction; therefore, the associated spin losses will be less and there will be an overall improvement in efficiency. The controlled differential and main shafts will have to be bigger due to the fact that they will have to take more torque but this may be offset by the reduction in weight of the output gear stages 3a, 3b.

FIG. 6 shows an alternative embodiment of the third aspect of the present invention. The overall transmission layout is similar to the first embodiment as described for FIG. 5 with the controlled differential connected directly to the transmission output enabling the controlled differential to rotate at a much slower speed and thus the losses associated with the centripetal forces will be considerably less. This enables an alternative controlled differential according to a first aspect of the present invention to be used which may be lighter and less costly than the one required to minimise the spin losses and bearing stresses for the transmission layout described in FIGS. 3 and 4.

The controlled differential layout according to an embodiment of the second aspect of the present invention comprises a pair of planetary gear sets or epicyclic gear trains joined back-to-back, each comprising a sun gear 10a, 10b, planet gear 11a, 11b, a planet carrier 14a, 14b and a ring gear 12a, 12b. The carrier 14a, 14b connect to the main output drive shafts 7a, 7b and the sun gears 10a, 10b connect to the steer motors 9a,9b via wheels 15a, 15b that mesh with a pinions 17a,17b via idlers 18a, 18b, 18c on the end of a steer motor shaft 19. The ring gears 12a, 12b connect to a cross-shaft 13. For straight-line driving, the steer motors 9a,9b pinion 17a,17b idlers 18a, 18b, 18c, wheels 15a, 15b and sun gears 10a, 10b are stationary whilst the ring gears 12a, 12b and carriers 14a, 14b can spin continuously. In this respect, energising the propulsion motors 1a, 1b to drive the sprockets 6a, 6b also rotates the planet carriers 14a, 14b and causes the planet gears 11a, 11b to rotate about the sun gears 10a, 10b. The annuli or ring gears 12a, 12b also rotate at the same speed due to being connected through the cross shaft 13, equalising the speeds of the two planet carriers 14a, 14b and the two connected transmission drives 1a, 1b causing the tracks to operate at the same speed and therefore move in a straight line.

The controlled differential will be rotating at a slower rate since it no longer has to go through the output gear reduction; therefore, the associated spin losses will be less and there will be an overall improvement in efficiency.

The vehicle is turned in one sense by operation of the steer motors 9a, 9b. The steer motor is energised to rotate the pinion 17a,17b in the same sense as the steer motor, thus causing the wheels 15a, 15b via idlers 18a, 18b, 18c and their respective sun gears 10a or 10b to rotate in mutually opposite senses. The two ring gears 12a, 12b must always turn together resulting in an increase in the rate of rotation of the planet gears 11a or 11b in that set for which the sun gear 10a or 10b is turning in the opposite sense to the respective annulus 12a or 12b and a decrease in the rate of rotation of the planet gears 11a or 11b in that set for which the sun gear 10a or 10b is turning in the same sense as the respective carriers 14a or 14b. This causes the carriers and their respective connected transmission drives to the sprockets 6a, 6b to run at different speeds thus turning the vehicle in the required sense, while power from the slower running transmission output drive is regenerated to the faster running transmission output drive through the controlled differential 8.

FIG. 7 shows another embodiment of the third aspect of the present invention having an alternative configuration for the controlled differential with an improved layout of the transmission. This embodiment has only one side of the controlled differential connected directly to the transmission output (left hand side in figure). This side of the transmission has one end of the main shaft 7a connected directly to carrier 14 of the controlled differential and the other end of shaft 7a to the transmission output. The torque and power from propulsion motor 1a passes through a gear range change unit 2a and output gear reduction stage 3a before connecting in parallel to the main shaft 7a. The other side of the transmission (right hand side in figure) has one end of the shaft 7b connected directly to the sun 10 of the controlled differential and the end of the shaft 7b connected to the input of the reduction stage 3b. The torque and power from the other propulsion motor 1b goes through a range change unit 2b before connecting in parallel to the shaft 7b. The combined torque and power from the propulsion motor 1b (via range change unit 2b) and controlled differential sun gear 10 go into the sun of gear reduction stage 3b. The transmission output on this side thus connects directly to the carrier of the gear reduction stage 3b. A final drive or final drive reduction gear (not shown in FIG. 7) may sit between the drive member and the controlled differential on one side and the gear reduction stage and drive member on the opposing side.

Thus in this embodiment the controlled differential is combined with one of the output gear reduction stages and combines two planetary gear sets or epicyclic gear trains. As shown in FIG. 7, the right output gear reduction stage 3b is used with the centre controlled differential gear stage 8 to steer the vehicle. The sun gear 10 of the controlled differential connects directly to the sun gear of the right output gear reduction stage 3b. The controlled differential carrier 14 connects directly to the carrier of the left output gear reduction stage 3a. The steering torque through the controlled differential is through the ring gear 12. A second planetary gear set is used only as part of the gear reduction stages between the controlled differential 8 and the steer motors 9a, 9b. The controlled differential ring gear is attached to the planetary gear reduction stage 21 and connects steer motor via wheel gear 15, idler 18, pinion 17 and steer motor shaft 19.

In this arrangement, the left output gear reduction stage 3*a* will only need to be sized for the maximum power and torque of the propulsion motor 1*a* whereas the right output gear reduction 3*b* stage will be sized for the maximum power and torque from the right propulsion motor 1*b* plus the steering power and torque from the controlled differential 8.

During straight line driving, the controlled differential sun gear 10 will rotate at the same speed as the right output stage 3*b* sun gear and the controlled differential carrier 14 will rotate at the same speed as the left output stage 3*a* carrier. The controlled differential ring gear 12 and the steer motor reduction gears 21, 15, 17, 19 and the steer motors 9*a*, 9*b* will be stationary. Since the rotational speed is the same as the output gear reduction stages 3*a*, 3*b*, the spin losses associated with controlled differential will be similar to the losses in the output gear reduction stages 3*a*, 3*b* and the centripetal forces on the planet gear 11 bearings will be considerably less, thereby improving efficiency and reducing heat loss. Also, the need for bearings to take high g-forces is no longer necessary.

To steer the vehicle, torque is applied at steer motors 9*a*, 9*b* which apply torque to the controlled differential ring gear 12 via the gear reduction stages, 17, 18, and 21. This will result in a differential torque at the sun gear 10 and the carrier 14 which will impose a torque difference between the main shafts. The torque from the controlled differential carrier 14 will go directly into the left transmission output and the torque from the controlled differential sun gear 10 will go into the right output gear reduction sun gear 3*b* and then goes through the right gear reduction 3*b*.

This layout results in an asymmetry between the left and right sides which is different from the other symmetrical system layouts herein described. Note that the controlled differential 8 gear ratio will need to be the same as the right output gear reduction stage 3*b* and the left output gear reduction 3*a*. During straight line driving, this will allow the propulsion motors to be the same size and rotate at the same speed and the output from the transmission to be the same on the left and right sides. However, the power transfer from left side to right side only goes through two gear stages (i.e. the controlled differential 8 and the right gear reduction 3*a*) which will improve the efficiency during steering.

A fifth aspect of the present invention relates to a significant change in the architecture of the drive transmission system to optimise the design for weight, volume, efficiency, reliability and cost. This is achieved by locating the propulsion motors on a secondary, parallel lay-shaft to the main shaft, along with multiple gear change stages. Any one of the controlled differentials discussed hereinbefore in relation to the prior art, first, second, third or fourth aspects of the present invention may be incorporated into the drive transmission systems of the fifth aspect of the invention. Again the arrangement is such that the controlled differential may connect directly to the transmission output with the range gear reduction stage 2*a*, 2*b* and the output reduction stage 3*a*, 3*b* being in series.

Figure 8:
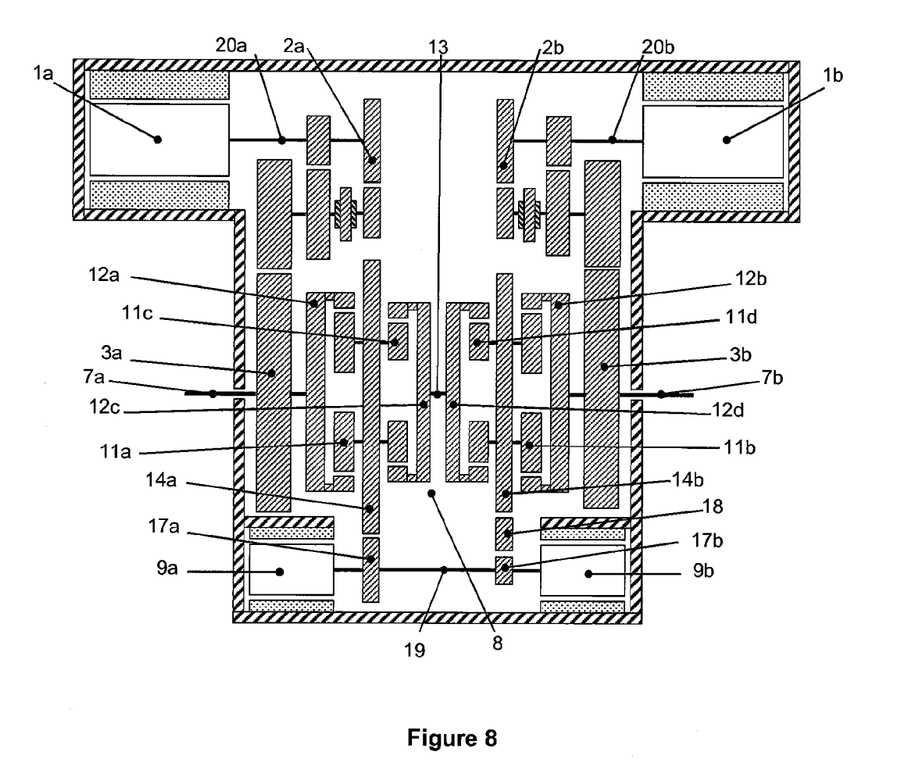
FIG. 8 is an embodiment of a drive transmission system according to a fifth aspect of the present invention fitted with the controlled differential shown in FIG. 3.

FIG. 8 shows one embodiment according to a fifth aspect of the present invention having an alternative drive transmission layout but with the controlled differential according to an embodiment of the second aspect of the invention shown in FIGS. 3 and 4. The propulsion motors 1*a* and 1 *b* are no longer in line with the main shaft 7*a*, 7*b* but instead are located on secondary lay shafts 20*a*, 20*b*. The associated range change gears 2*a*, 2*b* are also located on this lay-shaft and the gear reduction stage 3*a*, 3*b* is between the lay-shaft and the main shaft, thereby reducing the number of gears that are present on the main shafts between the left and right sides. Additionally, the controlled differential 8 has been adapted to reduce the loading on the planet gear bearings whilst straight-line driving, thereby reducing overheating and wear on the bearings and allowing standard bearings to be used. More specifically, the controlled differential 8 now has outer ring gears 12*a*, 12*b* attached to the main shafts 7*a*, 7*b* and inner ring gears 12*c*, 12*d* attached to a cross-shaft 13. The steer motors 9*a*, 9*b* connect to the carriers 14*a*, 14*b* of the planetary gear assembly via pinions 17*a*, 17*b* and idler 18 and there are no sun gears. This arrangement results in there being no load on the planet bearings until steer motor torque is applied or steering of the vehicle occurs. During straight-line driving, all of the ring gears 12*a*-12*d* rotate, causing the compound planet gears to rotate but the carriers 14*a*, 14*b* is stationary. The planet gears spin only about their pin axis and therefore are not subjected to any centripetal forces which result from the carrier spinning until steering occurs, thereby creating a more efficient controlled differential with parasitic losses at maximum vehicle speed reduced by around 60%, possibly even 80%, without the need for high-strength bearing cages with anti-wear coatings. Operation of the steer motor causes movement of the carrier and a corresponding change in rotation of the main shaft via the gears to effect steering of the vehicle.

Figure 9:
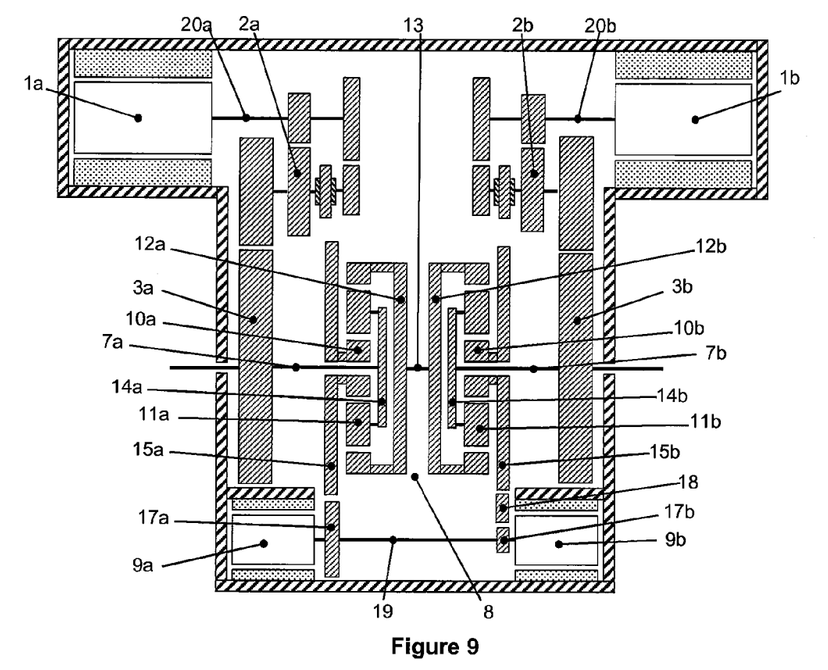
FIG. 9 is an embodiment of a drive transmission system according to a fifth aspect of the present invention fitted with the controlled differential of FIG. 6.

FIG. 9 shows an alternative embodiment of the fifth aspect of the present invention having the novel drive transmission layout of FIG. 8 but with a controlled differential 8 according to the first aspect of the invention, described hereinbefore in relation to FIG. 6. The propulsion motors 1*a* and 1 *b* are again no longer in line with the main shaft 7*a*, 7*b* but instead are located on secondary lay shafts 20*a*, 20*b*. The associated range change gears 2*a*, 2*b* are also located on this lay-shaft and gear reduction stage 3*a*, 3*b* is between the lay-shaft and the main shaft, thereby reducing the number of gears that are present on the main shafts between the left and right sides. Additionally, as described in relation to FIG. 6, the controlled differential 8 has been adapted to reduce the loading on the planet gear bearings whilst straight-line driving, thereby reducing overheating and wear on the bearings and allowing standard bearings to be used. More specifically, the controlled differential 8 now has outer planet carriers 14*a*, 14*b* attached to the main shafts 7*a*, 7*b* and ring gears 12*a*, 12*b* attached to a cross-shaft 13. The steer motors 9*a*, 9*b* connect to the sun gears 10*a*, 10*b* of the planetary gear via the wheel gear 15*a*, 15*b*, idler 18, and pinions 17*a*, 17*b*.

During straight-line driving, all the planet carriers 14*a*, 14*b*, and ring gears 12*a*, 12*b* rotate and sun gears 10*a*, 10*b*, wheel gears 15*a*, 15*b*, idler 18, pinions 17*a*, 17*b* and steer motors 9*a*, 9*b* are stationary. There are centripetal forces which result from the carrier spinning but the speeds are much slower thereby creating a more efficient controlled differential with parasitic losses at maximum vehicle speed reduced without the need for high-strength bearing cages with anti-wear coatings. Operation of the steer motors 9*a*, 9*b* causes movement of the pinion 17*a*, 17*b*, idler 18, wheel gears 15*a*, 15*b* and sun gears 10*a*, 10*b* and a corresponding change in rotation of the main shaft via the gears to effect steering of the vehicle.

The lay-shaft arrangement shown in FIGS. 8 and 9 provides a number of benefits over the prior art. Placement of the selectable gears and gear reduction stages between the propulsion motors and the main shaft enables the differential to run at the same speed as the transmission output whilst the propulsion motors are not limited to this speed. Furthermore, the presence of fewer gear stages between the controlled differential and the final output to the tracks or wheels reduces the loss during steer power transfer between the inside and outside sprocket. The ability of the planet gears to rotate only about their pin axis during straight line driving as in the arrangement shown in FIG. 8 also assists in addressing this issue. This increases the efficiency of the arrangement.

The drive transmission according to the present invention also enables the output reduction gears associated with the propulsion motor to be reduced in size as they no longer have to take the full steering power and torque (i.e. full cross-shaft regenerative power and the propulsion power) but instead take only the power of the propulsion motor. In this respect, steering powers can be typically 200% to 300% higher than the propulsion motor power and steering torque about 80% higher. Locating the propulsion motor away from the middle of the configuration also makes these motors more accessible aiding in assembly and maintenance of the propulsion motors.

The motor speed sensing resolver can be fitted to the end of the propulsion motor (similar to the steer motors in prior art) which would allow a smaller standard size resolver to be fitted rather than a large custom designed resolver which needs to fit around the main shaft in the in-line configuration. This arrangement also will minimise the amount of sensor interference from any induced currents within the main shaft allowing a more stable resolver signal to the electric motor inverter drives.

This arrangement also isolates the electric motors from the gearbox, reducing concerns about gearbox oil compatibility with the motors and electric machining damage from the electric motors to the gears.

The lay-shaft arrangement can also be more compact and versatile. In particular, optimum design, in terms of motor size and shape, is more easily achievable since maximum length of the motor is less of a constraint. Gear size and ratio can also be optimised for face width and diameter since the need to have very narrow gears with a large diameter to fit in-line with the propulsion motors has been alleviated in this embodiment of the invention.

Figure 10:
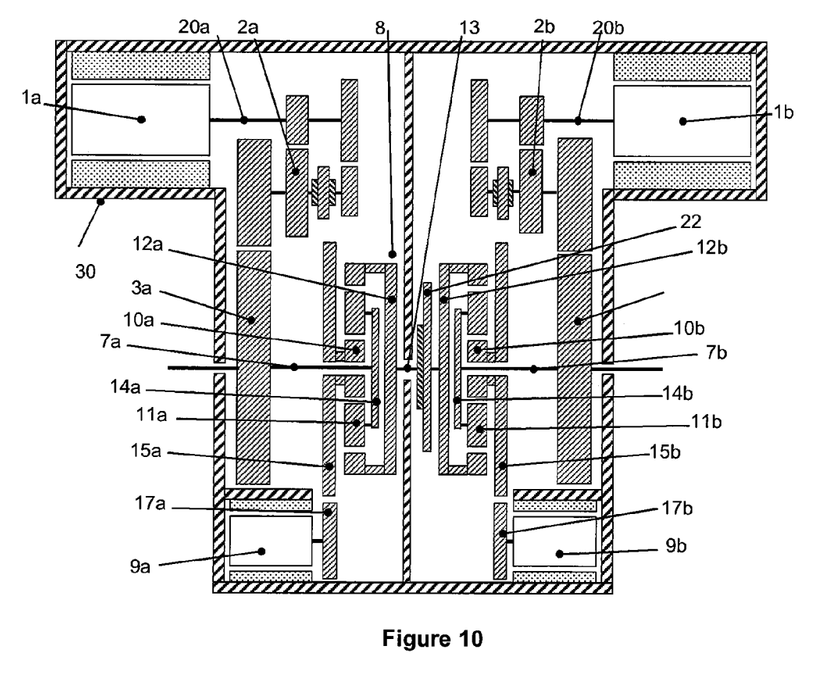
FIG. 10 is an embodiment of a drive transmission system according to a sixth aspect of the present invention, fitted with the controlled differential of FIG. 6.

Referring to FIG. 10 of the accompanying drawings, one embodiment of a sixth aspect of the present invention is illustrated. The embodiment shown has a drive transmission arrangement similar to that shown in FIG. 9, having the propulsion motors 1a, 1b, range change gears 2a, 2b and output gear reduction 3a, 3b located on a separate lay-shaft 20a, 20b to reduce the number of gear stages on the main shaft and to enable the controlled differential to run at the same speed as the final drive output. The controlled differential 8 is again symmetrical with carriers 14a, 14b as the output and ring gears 12a, 12b connecting the cross-shaft 13, with steering power provided from the planet suns 10a, 10b.

Additionally, the arrangement includes a locking clutch mechanism 22 coupled to the cross shaft 13 to enable locking of the cross shaft to the case 30 to allow the steer motors 9a, 9b to drive the vehicle at low speed as in a two-line system of the prior art. This enables the steering motor to switch between a normal configuration (wherein the steer motors provide steering power and the propulsion motors are used for propulsion) and a configuration where the steer motors can be used to drive the vehicle. The steer motors could be used to drive the vehicle to provide extra torque and power to the propulsion motors or could be used in the event of a failure of a propulsion motor. Since the gear ratio to steer motors is generally high, using the steer motors for driving the vehicle will most likely be used at low speed up to the speed, torque and power limit of the steer motor.

Once the vehicle is required to travel at high speeds, the clutch mechanism is used to unlock the centre shaft, enabling the steering motor to be used for steering and the propulsion motors to be used for propulsion. Note the steer motors are no longer connected together on a common shaft, as described in the earlier embodiments of the invention.

In detail, during normal operation both control differential carriers 14a, 14b, planet gears 11a, 11b, and both ring gears 12a, 12b rotate while both sun gears 10a, 10b steer motors 9a, 9b and associated gear reduction stages are stationary. Driving the steer motors 9a, 9b in opposite directions applies steering torque and power through the controlled differential 8 and the drive transmission operates in the standard manner with the steer motors providing steering power and the propulsion motors providing traction power.

Prior to application of the locking mechanism 22, it is necessary to drive the steer motors 9a, 9b together in the same direction to spin up the sun gears 10a, 10b of the controlled differential and slow down the controlled differential cross shaft 13. Once the cross shaft rotation speed reaches zero, the locking mechanism 22 may be applied to lock the cross shaft to the case 30. From this point, the steer motors are able to apply torque and power through the controlled differential 8. Each steer motor can be controlled independently and can apply torque and speed at each output to either drive the vehicle directly or as a supplement to the respective propulsion motors.

It is to be appreciated that the ability to lock the centre shaft by way of a clutch mechanism 22 may be provided for other types of drive transmission systems in addition to the type shown in FIG. 10 and to systems using other types of controlled differentials to enable the steer motors to drive the vehicle at low-speed and high torque.

The present inventions concern improvements to various aspects of drive transmission systems for skid steered vehicles, including the provision of an additional lay-shaft or twin shaft arrangement for mounting of the propulsion motor(s) and/or gear shifts and modifications to the controlled differential. Any one transmission system may include one, some or all of the changes discussed herein. The optimal embodiment chosen for a given vehicle will depend upon the operating environment and other factors, such as cost, efficiency, reliability, power and weight.

The invention claimed is:

1. An electric drive configuration for a skid steered vehicle comprising:
   a respective drive member adapted to be located at each side of the vehicle, each drive member engaging with a track or a wheel of the vehicle;
   at least one electric propulsion motor in operable communication with said drive members operable to drive the tracks or the wheels of the skid steered vehicle; and
   at least one steer motor in driveable communication with a controlled differential, the controlled differential being positioned between and connecting two shafts and being in driveable communication with each shaft, the ends of each shaft remote from the controlled differential forming a transmission output and being in driveable communication with the drive members;
   wherein at least part of an output of the controlled differential connects directly via each shaft to the transmission output, and
   wherein the drive configuration further includes a gear reduction unit and a gear change unit, the propulsion motor, the gear reduction unit, and the gear change unit being connected in parallel with respect to the transmission output.

2. The drive configuration as claimed in claim 1 wherein a spline coupling connects a part of the controlled differential directly to each shaft.

3. A drive configuration as claimed in claim 1, wherein the controlled differential comprises a pair of planetary gear sets, each comprising a sun gear, planet gears carried by a planet carrier and a ring gear, the sun gears being coupled to at least one steer motor whereby operation of the steer motor enables rotation of the sun gears in mutually opposite senses, the planet carriers being interconnected by a cross-shaft such that the carriers rotate in common, the shafts of the drive configuration being coupled to respective ring gears.

4. The drive configuration as claimed in claim 1, wherein the controlled differential is adapted to couple the two shafts and a steer input from at least one steer motor, the controlled differential comprising: a pair of planet carriers arranged to turn with the respective shafts; a pair of ring gears interconnected by a cross-shaft such that the ring gears rotate in common; planet gears and a pair of sun gears, the sun gears being coupled to the at least one steer motor to enable rotation of the sun gears in mutually opposite senses upon input from the steer motor.

5. The drive configuration according to claim 1 incorporating the controlled differential adapted to couple the two shafts and a steer input, such as those provided in the drive configuration for the skid steered vehicle, the controlled differential comprising: a planet carrier arranged to turn with one of said shafts and being in direct communication with an output carrier of a first output gear reduction stage; a first controlled differential sun gear arranged to turn with the other of said shafts and being in direct operable communication with a second sun gear of a second output gear reduction stage; a ring gear being coupled to at least one steer motor through a series of gear reduction stages to enable a differential torque to be applied at the first sun gear and planet carrier.

6. The drive configuration as claimed in claim 1, wherein the ends of each shaft remote from the controlled differential are in direct contact with the drive members.

* * * * *

UNITED STATES PATENT AND TRADEMARK OFFICE
CERTIFICATE OF CORRECTION

| | |
|---|---|
| PATENT NO. | : 9,975,576 B2 |
| APPLICATION NO. | : 14/896660 |
| DATED | : May 22, 2018 |
| INVENTOR(S) | : Robert John Bonner Flaxman |

It is certified that error appears in the above-identified patent and that said Letters Patent is hereby corrected as shown below:

In the Specification

Column 1, Lines 6-9, under GOVERNMENT LICENSE RIGHTS, is amended as follows:
The present inventions were made with government support under contract numbers W56HZV-11-C-0001 and W50RAJ-20-9-C014 awarded by United States Department of Defense. The government has certain rights in the inventions.

Signed and Sealed this
Twelfth Day of September, 2023

Katherine Kelly Vidal
*Director of the United States Patent and Trademark Office*